Feb. 14, 1939. G. V. RYLSKY 2,147,108
RATE OF CLIMB INDICATOR
Filed Sept. 17, 1936 2 Sheets-Sheet 1
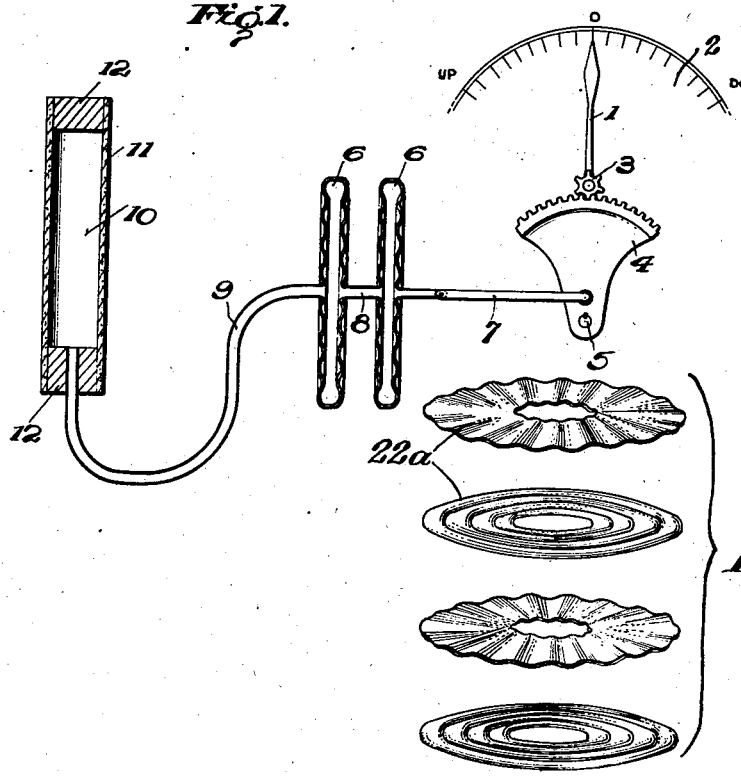
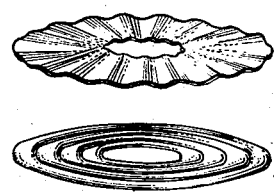
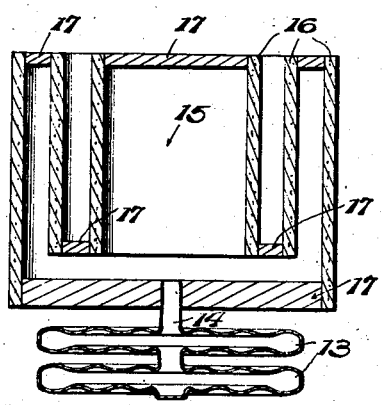
Inventor
Gregory V. Rylsky
By Stephen Cerstvik
Attorney Feb. 14, 1939. G. V. RYLSKY 2,147,108
RATE OF CLIMB INDICATOR
Filed Sept. 17, 1936 2 Sheets-Sheet 2
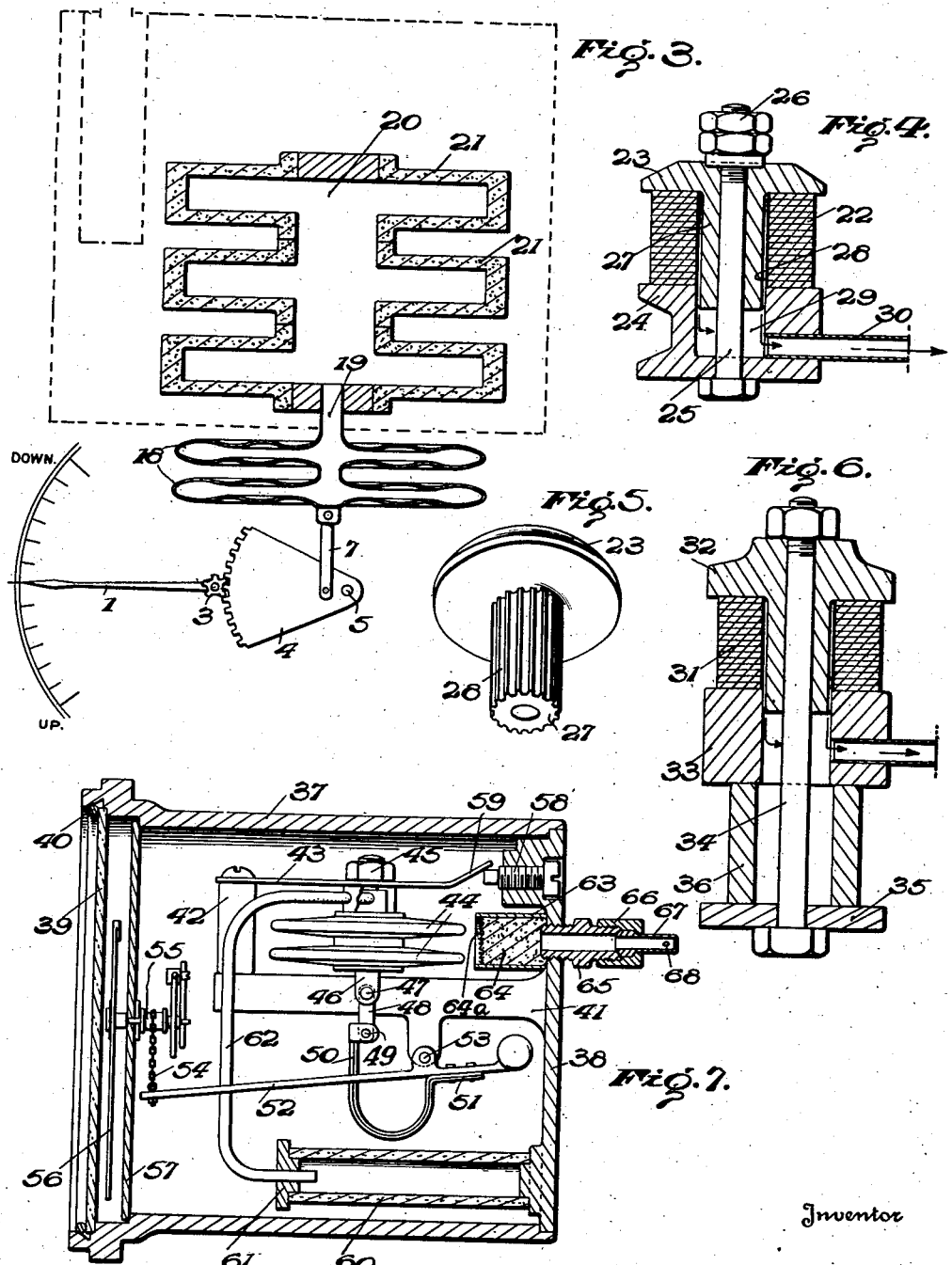
Inventor
Gregory V. Rylsky
By Stephen Cerstvik
Attorney Patented Feb. 14, 1939

2,147,108

UNITED STATES PATENT OFFICE 2,147,108

RATE OF CLIMB INDICATOR

Gregory V. Rylsky, New York, N. Y., assignor to Bendix Aviation Corporation, South Bend, Ind., a corporation of Delaware Application September 17, 1936, Serial No. 101,346

24 Claims. (Cl. 264—1)

This invention relates to pressure responsive instruments in which a differential between the pressures outside and inside a pressure responsive element, established by a change of one of said pressures, is utilized to operate an indicator and wherein communication between the outside and inside pressures is controlled so as to provide for equalization of said pressures when the condition causing such change no longer exists. By way of example, rate of climb indicators embody this operation, but it is to be understood that the invention is not limited to use in rate of climb indicators but may be broadly applied to any instrument which operates according to the above principle. For purposes of explanation and illustration, however, the invention is described hereinafter in connection with a rate of climb indicator.

Heretofore in rate of climb indicators the aforesaid pressure differential has been controlled by connecting the outside and inside of the pressure responsive means through a capillary tube. In an instrument of this capillary type, it is necessary for accuracy over considerable ranges of altitude to employ compensating devices to compensate for the influence of altitude on the readings of the instrument and for errors in said readings due to temperature changes. Further, capillary tubes are unstable as to the condition of the internal surfaces of the tubes due to factors such as corrosion of the surfaces and condensation of moisture thereon, and also the time lag necessary to restore equilibrium of pressure is undesirably long after the rate of climb becomes zero. Still further, in order to obtain reliable and accurate indications it is necessary to have a considerable operating volume.

One of the objects of this invention is to provide a novel instrument of the type characterized above, wherein the capillary tube is eliminated and its disadvantages referred to above are avoided.

Another object is to provide an instrument of the type characterized above wherein equalization of pressures outside and inside of the pressure responsive element takes place by molecular diffusion of the atmosphere.

A further object is to provide a novel instrument of the type characterized above wherein equalization of pressures outside and inside of the pressure responsive element takes place by diffusion of the atmosphere through a wall of porous material.

A still further object is to provide an instrument of the type characterized above in which compensation for the influence of altitude on the readings of the instrument is unnecessary.

Another object is to provide a novel instrument of the type characterized above wherein the volume and size of the instrument are substantially reduced as compared with the capillary type of instrument.

Another object is to provide a novel instrument of the type characterized above wherein the time lag in equalization of pressure is reduced as compared with the capillary type of instrument.

A further object is to provide an instrument of the type characterized above embodying novel diffusing means constructed and arranged so as inherently to provide compensation for changes of temperature.

Other objects of the invention will appear more fully hereinafter as the description proceeds.

As indicated above, the invention is described hereinafter in connection with rate of climb indicators and several embodiments of the invention in rate of climb indicators are illustrated in the accompanying drawings, but it is to be expressly understood that the drawings are for purposes of illustration only and are not to be construed as a definition of the limits of the invention, reference being had to the appended claims for this purpose.

In the drawings:

Fig. 1 is a diagrammatic illustration of the elements of a climb indicator or other instrument embodying the invention;

Fig. 2 is an illustration of one form of the diffusing element which may be employed;

Fig. 3 illustrates another form of diffusing element which may be employed;

Fig. 4 is a sectional view of a further type of diffusing element;

Fig. 5 is a perspective view of part of the construction of Fig. 4;

Fig. 6 is a sectional view of a further form of diffusing element with special provision for temperature compensation; and Fig. 7 is a view, partly in section, of a climb indicator embodying the invention; and Fig. 8 is an enlarged view, illustrating the structure of the washers of Figs. 4 and 6.

The operation of an instrument utilizing diffusing means which embody the present invention can be more readily explained by reference to Fig. 1 which shows in diagrammatic form all of the essential elements for an instrument such as a rate of climb indicator. Referring to this figure, the pointer 1 is operated with respect to a suitable scale 2 by any suitable motion transmitting mechanism such as the pinion 3 on the pointer spindle which meshes with a gear sector 4 pivotally mounted at 5. A pressure responsive element of any suitable type, and here shown as comprising two expansible and contractible vessels 6, is connected with the gear sector 4 by means of the link 7. The space within the vessels 6, which are in communication by means of the tube 8, is connected by a second tube 9 with a vessel 10 comprising a wall 11 of cylindrical or other suitable shape and end closures 12. Accordingly, the space within the vessel 10, tube 9, and vessels 6 constitutes a chamber that is sealed except that wall 11 is of suitable diffusing material as hereinafter explained, and the pressure responsive element 6 is subjected to the pressure in said chamber.

According to the well-known theory of diffusion of gases, molecules are constantly passing through the wall 11 in both directions, that is, from outside to inside as well as from inside to outside. According to the kinetic theory of gases, the pressure inside and outside the pressure chamber is due to molecular movement in the gases and is a function of the number of molecules, the mass of each molecule, and the square of the mean velocity of the molecules. If the pressure outside the pressure chamber should diminish due to a change in altitude, the pressure responsive element 6 tends to expand because the pressure inside, determined according to the above function, remains the same with the result that the link 7 swings the gear sector 4 and thereby rotates the pointer 1 with respect to the scale 2. At the same time, the molecules escape from the chamber at a greater rate than they enter the chamber with the result that, if no further decrease of pressure takes place outside the chamber, equilibrium will be restored in a certain time or lag and the pointer 1 will be returned to its normal or zero position. However, as long as the pressure on the outside of the chamber continues to decrease due to continually increasing altitude, the pressure inside the chamber will continue to be greater than the pressure outside and the instrument will continue to indicate climb. The reverse operation takes place in case of descent instead of climb.

Hence, by interposing between the pressure chamber and the outside atmosphere a medium which is porous in the sense that it permits molecular diffusion, there is provided an instrument wherein differential pressures are indicated on the scale as long as a change of pressure is taking place, but whereby equilibrium is rapidly restored as soon as change in pressure no longer takes place. As hereinafter shown, the diffusing medium may take the form of a material which is of such porous character as to permit diffusion therethrough or special arrangements can be provided whereby diffusion takes place between closely adjacent structural elements. By varying the material, porosity, thickness and area of the diffusing medium, the characteristics can be controlled within wide limits and particularly so that the altitude has substantially no influence on the readings of the instrument and no special compensating means are required as in the case of the usual capillary tube.

Fig. 2 shows an arrangement for increasing the area of the diffusing medium without substantial increase in the size. In this construction, expansible and contractible elements 13 are connected by a tube 14 with a closed vessel 15 which comprises concentric cylindrical walls 16 of suitable diffusing material, the vessel being closed by the closure members 17 in such a way that the area of the diffusing medium comprises the total surface of all of the cylindrical walls 16. Only three of these concentric cylindrical walls are shown in the drawings, but it will be understood that the arrangement may be extended to include additional diffusing walls if desired.

Fig. 3 illustrates another arrangement for obtaining increased diffusing area. In this arrangement the expansible and contractible vessels 18 are connected by tube 19 to a vessel 20 comprising a plurality of capsules 21 of suitable diffusing material that are connected at their centers to form a single vessel.

Figs. 4, 5 and 8 illustrate another form of diffusing means wherein diffusion takes place between closely adjacent elements rather than through a porous material. These elements take the form of a plurality of thin washers 22a, (see Fig. 8), preferably of metal, that are clamped tightly together between upper and lower clamping members 23 and 24 (see Fig. 4) by any suitable means such as the bolt 25 and nuts 26 thereby forming a stack 22. The clamping member 23 preferably has an extension 27 passing through the central opening in the stack of washers 22 and this extension, as shown in Fig. 5, is provided with parallel grooves 28 to permit the passage of air from the stack of washers to the chamber 29 in the lower clamping member 24 and thence through tube 30 to the pressure responsive element (not shown). The washers 22 are preferably of thin metal having high heat conductivity so that the diffuser is not substantially affected by sudden changes of temperature. The surfaces of said washers are chosen or suitably treated to give the desired range of porosity to the stack. For example, they may be etched or provided with radial and/or concentric corrugations as shown in Fig. 8. These discs or washers, when stacked as shown in Fig. 4, provide a cylinder the porosity of which can be adjustably varied by changing the pressure thereon by means of the bolt 25 and nut 26.

If desired, for purposes of temperature compensation, the parts may be of such materials as to provide, in effect, a bi-metallic action to regulate the pressure on the stack of discs and thereby to control the porosity in accordance with the temperature. For example, the bolt 25 whereby the stack is compressed may be made of material such as copper having a relatively high thermal expansion coefficient as compared with clamping members 23 and 24 and washers 22 with the result that the pressure on the stack is decreased as the temperature increases. With an increase in temperature, the escape of the air through the diffuser would ordinarily decrease. By reducing the pressure on the stack with an increase in temperature, the effective cross-section area of the passages for the escape of the air, is increased, thereby compensating for the decrease in flow due to the temperature rise. With a different type of diffuser the temperature action is varied as described below so that diffusion varies in the proper direction.

Fig. 6 shows a somewhat similar construction wherein means are provided for increasing the temperature compensating effect. In this figure a stack 31 is formed by clamping individual washers 22a between the upper and lower members 32 and 33 by means of the bolt 34. The head of the bolt engages a disc or washer 35 which is spaced from the clamping member 33 by suitable cylindrical spacer 36. Depending on the relative coefficients of thermal expansion of bolt 34 as compared with spacer 36, clamping members 32 and 33 and washers 31, the pressure on the stack 31 can be either decreased or increased as the temperature increases. The length of the assembly is increased by the provision of the spacer 36 so that the temperature compensating effect is correspondingly increased.

Fig. 7 shows an embodiment of the invention in an instrument such as a rate of climb indicator of suitable construction. The instrument comprises a case 37 closed at one end by a plate 38 and at the other end by a glass 39 held in place by a snap ring 40. Secured to or formed integrally with the base plate 38 is a standard 41 having at its end a post 42 to which is secured a resilient arm 43, the latter being in the form of a leaf spring for example. The pressure responsive element, which in the form shown comprises two expansible and contractible vessels 44, is carried by the resilient arm 43 and secured thereto by suitable means such as the nut 45. A post 46 mounted on one of the vessels 44 is pivotally connected at 47 to one end of a link 48, the other end of which is pivoted at 49 to the end of a substantially U-shaped bi-metallic temperature responsive element 50. The opposite end of the bi-metallic element 50 is rigidly secured at 51 to an arm 52 that is pivoted at 53 on the standard 41 and is adapted through suitable connections to operate the pointer of the instrument in response to expansion and contraction of the pressure responsive element 44. In the form shown, said arm is connected by a chain 54 with a pulley 55 mounted on the spindle of a pointer 56 that rotates with respect to a dial plate 57. The zero position of the pointer and operating mechanism can be adjusted by means of the screw 58 which engages the bent end 59 of the spring arm 43.

The space within the vessels 44 is connected in any suitable manner with the interior of a diffuser whereby the atmosphere within said vessels may diffuse into the casing 37, which in turn is vented to the atmosphere outside the casing. The diffuser, which may be of any of the forms described above or of any other suitable form, is here shown in the form of a cylindrical or tubular wall 60 of suitable porous material, one end of which is fitted against and closed by the base plate 38 and the other end of which is closed by a plug 61. Communication between the interior of the pressure responsive vessels 44 and the diffuser 60 is effected by means of the tube 62. The casing 37 is preferably vented to the outside atmosphere through a suitable dehumidifying medium 64, such as silica gel, which may be disposed in the tube 63 and covered by the screen 64a. Air enters and leaves the casing through an opening in the base plate 38 that is disposed within the tube 63, said opening having a nipple 65 and cap 66 for mounting a vent tube 67 provided with vent holes 68.

It will be seen that the air pressure within the casing 37 is the same as the air pressure outside the instrument due to the provision of the venting means described above. However, the air within the pressure responsive vessels 44 and diffuser 60 is sealed from the air within the casing 37 except for diffusion through the porous wall 60. When a change in altitude takes place, the pressure in the casing 37 varies, causing an indication of the pointer 56 in the manner described above, but as soon as the altitude is no longer changing, equilibrium is restored by diffusion through the wall 60 and the pointer 56 returns to its zero position.

Various porous materials are suitable for use in instruments embodying the present invention, such as carbon, porcelain, compressed powder or metal wool, paper, very thin metal such as gold leaf, etc. In general, where use is made of diffusing material rather than of laminations such as shown in Figs. 4 and 6, the material should be both porous and rigid. The best results are obtained with materials having many small grains and hence many small, short passages, because when the grains are large the length of the uninterrupted passages becomes longer and capillary action increases. Furthermore, the grains should be sharp instead of smooth and round because in the latter case smooth passages are formed and capillary action takes place. Therefore, it is desirable to employ material that is crystalline in structure and bonded together in such a way that high temperatures will not glaze the edges, while the binder should be such that it is completely consumed or combined with the material either chemically or at high temperatures.

In general, any material having the above characteristic is suitable although it will be understood that the diffusing characteristics of different materials will vary so that certain materials may be preferable for particular uses. For use in climb indicators and other instruments subjected to like conditions, the material should not be affected by humidity or by sudden changes in temperature. As examples of materials which have been found well suited for use in climb indicators, there may be mentioned carbon and porcelain made of fine, sharp-edged grains held together by a suitable binder. Carbon tubes may be made of fine grains of amorphous carbon of coke base mixed with a coal tar binder and extruded under pressure and heat. Under these conditions the resulting tube gives substantially perfect altitude compensation over an altitude range from zero to thirty thousand feet. In an instrument of the type illustrated in Fig. 7, a tube approximately 3" long and of 1" outer diameter and ⅞" inner diameter has been found to give excellent results. Porcelain tubes suitable for this use may be made from fused magnesia pulverized in a ball mill until the material passes a 220 mesh screen. This pulverized material is mixed with a suitable binder and water, extruded and fired during which the binder is burned out. In an instrument of the type illustrated in Fig. 7, a porcelain tube made as described above and ¾" long, 0.150" outer diameter with 0.011" wall thickness has given excellent results with nearly perfect altitude compensation over a range from zero to thirty thousand feet.

It will be understood that the foregoing examples are illustrative only, since wide variation in the nature of the materials as well as in size and shape of the diffuser may be experienced. For example, the material may be used in any of the shapes such as shown in the drawings or in the form of discs, caps, plugs, etc. Porosity may be controlled to some extent by the size of the grain, the amount of binder used, and the pressure used while extruding, and differences in porosity may be adjusted by varying the area of the diffusing material.

From the foregoing it will be seen that the invention makes possible the elimination of the usual capillary tube and the disadvantages inherent therein. With suitably selected diffusers, practically perfect altitude compensation can be obtained over all ranges of altitude likely to be encountered in modern aviation so that no special compensating means need be employed. The use of a diffuser instead of a capillary tube provides reliable and stable operation with an instrument of small volume, eliminating the provisions made in the capillary type instrument for large volumes and restricting the instrument to a casing of ordinary size. The operation of instruments embodying the invention is improved over that of the capillary type in that the time lag necessary to restore equilibrium is materially decreased.

While several embodiments of the invention have been described herein and illustrated in the drawings, it is to be expressly understood that the invention is not limited thereto but is capable of a wide variety of mechanical forms, materials and sizes many of which will now occur to those skilled in the art. Reference is accordingly to be had to the appended claims for a definition of the limits of the invention.

What is claimed is:

1. In an instrument of the class described, an indicator, a pressure responsive means, an actuating connection from said means to said indicator, and porous means separating the atmosphere inside and outside said pressure responsive means, said porosity being so chosen as to regulate the diffusion of said atmospheres therethrough whereby altitude compensation is automatically obtained.

2. In an instrument of the class described, an indicator and pressure responsive means for actuating said indicator, porous diffusing means providing communication by molecular diffusion between the atmospheres inside and outside of said pressure responsive means said porosity being such that the molecular diffusion therethrough is so regulated as to produce altitude compensation.

3. In an instrument of the class described, an indicator and pressure responsive means for actuating said indicator and having a wall area comprising a diffusing medium, the composition of said medium and the area being so regulated that altitude compensation ensues.

4. In an instrument of the class described, the combination of an indicator, means for actuating said indicator comprising a pressure chamber having walls a part of which is movable in response to pressure in said chamber and another part of which comprises a diffusing medium, the wall area and composition of said diffusing medium being so regulated that altitude compensation ensues.

5. In an instrument of the class described, an indicator, a pressure responsive element for actuating said indicator, said element providing a pressure chamber, and means through which said chamber is in communication with the outside atmosphere, said means comprising solely a porous closure so regulating the diffusion therethrough that altitude compensation ensues.

6. In an instrument of the class described, an indicator, a pressure responsive element comprising a chamber for actuating said indicator, means providing an additional pressure chamber for said element, and means comprising a wall of diffusing material through which said additional chamber is in communication with the outside atmosphere the area of said wall and the structure of said material so controlling the diffusion that altitude compensation ensues.

7. In an instrument of the class described, an indicator, a pressure responsive element for actuating said indicator, and means whereby the atmospheres inside and outside said element are in communication said means comprising closely adjacent elements having uneven surfaces to provide for diffusion therebetween.

8. In an instrument of the class described, an indicator, a pressure responsive element for actuating said indicator, and means whereby the atmospheres inside and outside said element are in communication, comprising closely adjacent elements having uneven surfaces to provide for diffusion therebetween, and means for pressing said surfaces together.

9. In an instrument of the class described having a pressure responsive expansible and contractible chamber and an indicator actuated thereby, means providing communication between the atmospheres inside and outside thereof comprising a diffuser having a plurality of concentric, tubular walls of diffusing material, each two adjacent walls being connected together at one end and two adjacent pairs having said connections at opposite ends thereof to provide a chamber.

10. In an instrument of the class described having a pressure responsive expansible and contractible chamber and an indicator actuated thereby, diffusing means providing communication between the atmospheres inside and outside thereof and comprising a plurality of capsule-like members of diffusing material that are in communication with each other at their central portions to form a closed vessel.

11. In an instrument of the class described, an indicator and pressure responsive means for actuating said indicator including a pressure chamber, and diffusing means providing communication between said chamber and the atmosphere outside thereof comprising a plurality of laminations having uneven surfaces, means for clamping said laminations together and forming therewith a chamber that is closed except for diffusion between said laminations, and means connecting said closed chamber with said pressure chamber.

12. In an instrument of the class described, an indicator, pressure responsive means including a pressure chamber for actuating said indicator, and diffusing means whereby said pressure chamber is in communication with the atmosphere outside thereof, said diffusing means comprising a plurality of stacked washers having uneven surfaces, means clamping said washers together and forming therewith a diffusing vessel, and means connecting said vessel with said pressure chamber.

13. In an instrument of the class described, an indicator, pressure responsive means including a pressure chamber for actuating said indicator, and diffusing means whereby said chamber is in communication with the atmosphere outside thereof, said diffusing means comprising a stack of annular members having uneven surfaces, clamping members for said stack and forming therewith a diffusing vessel, means for clamping said members together, and a connection from said vessel to said chamber, said clamping means being of material having a coefficient of thermal expansion substantially different from that of said washers.

14. In an instrument of the class described, an indicator and pressure responsive means for actuating said indicator comprising a wall area of porous carbon.

15. In an instrument of the class described, an indicator and pressure responsive means for actuating said indicator comprising a porous wall area of a binder-free porcelain.

16. In an instrument of the class described, an indicator and pressure responsive means for actuating said indicator comprising a wall area of a porous earthenware formed of fine, binder-free sharp-edged grains adapted to allow diffusion therethrough.

17. In combination, an expansible diaphragm having a yielding wall subject to a changing atmospheric pressure on one side thereof, diffusing means for retarding the rate at which pressure on the other side of said yielding wall tends to become equal to said changing atmospheric pressure due to changes in altitude, indicating means actuated by said yielding wall in accordance with the rate of change of altitude, and temperature responsive means modifying said diffusion for producing a compensating effect on said indicating means in accordance with changes in temperature so that said indicating means will give true indications irrespective of said changes in temperature.

18. In a rate of climb indicator for aircraft, the combination of an expansible diaphragm device operated in accordance with changes in altitude, a member of porous material closed at one end and connected to the interior of said diaphragm device for retarding the rate at which the pressure on the inside of said diaphragm device tends to become equal to a changing atmospheric pressure due to changes in altitude, and indicating means actuated by said diaphragm device for indicating the rate of change of altitude the porosity of said material so regulating the diffusion therethrough that altitude compensation ensues.

19. In combination, a pressure responsive device having a movable wall subject to a changing atmospheric pressure on one side thereof, diffusing means for retarding the rate at which pressure on the other side of said movable wall tends to become equal to said changing atmospheric pressure, indicating means actuated by said movable wall in accordance with the rate of change of altitude, and temperature responsive means modifying said diffusion for producing a compensating effect on said indicating means in accordance with changes in temperature so that said indicating means will give true indications irrespective of said changes in temperatures.

20. Means responsive to changes in altitude comprising a pressure responsive element, and means leading from one side of said element for pressure equalization thereon comprising a plurality of short sharply modified sharp cornered passages in seriatim.

21. In an instrument of the class described, a pressure responsive element, means for equalizing the pressure on the two sides of said element, said means comprising diffusing means having prescribed areas, and means responsive to temperature whereby the prescribed escape areas are modified.

22. In a device of the character described, diffuser means, and means responsive to changes in temperature whereby the diffusing action of said means is modified in accordance with temperature changes.

23. In a rate of climb indicator for aircraft, an expansible diaphragm member having a yielding wall subject to a changing atmospheric pressure on one side thereof, a porous member for controlling the rate at which the pressure on the other side of said yielding wall tends to become equal to said changing atmospheric pressure due to changes in altitude, and indicating means actuated by said diaphragm device for indicating the rate of change of altitude, the porosity of said member so regulating the diffusion therethrough that altitude compensation ensues.

24. In combination, an expansible element subject to a changing atmospheric pressure on one side thereof and a porous member for controlling the rate at which pressure on the other side of said element tends to become equal to said changing atmospheric pressure due to changes in altitude, the porosity of said member so regulating the diffusion therethrough that altitude compensation ensues.

GREGORY V. RYLSKY.